(12) United States Patent
An et al.

(10) Patent No.: US 7,978,282 B2
(45) Date of Patent: Jul. 12, 2011

(54) LIQUID CRYSTAL DISPLAY

(75) Inventors: Jun Seok An, Suwon-si (KR); Dae Hyoun Byoun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 12/274,408

(22) Filed: Nov. 20, 2008

(65) Prior Publication Data

US 2009/0147173 A1 Jun. 11, 2009

(30) Foreign Application Priority Data

Dec. 7, 2007 (KR) .................. 10-2007-0127121

(51) Int. Cl.
*G02F 1/1333* (2006.01)
(52) U.S. Cl. .......................................... 349/58
(58) Field of Classification Search .......... 349/58
See application file for complete search history.

(56) References Cited

U.S. PATENT DOCUMENTS

| | | | | |
|---|---|---|---|---|
| 7,436,468 | B2 * | 10/2008 | Song et al. ............... | 349/61 |
| 2006/0193148 | A1 | 8/2006 | Bang | |
| 2007/0019419 | A1 * | 1/2007 | Hafuka et al. ............ | 362/373 |

FOREIGN PATENT DOCUMENTS

| | | |
|---|---|---|
| CN | 1564067 | 1/2005 |
| CN | 1828388 | 9/2006 |
| CN | 1971368 | 5/2007 |
| KR | 1020060054742 | 5/2006 |
| KR | 10-0609057 | 8/2006 |
| KR | 1020060095829 | 9/2006 |
| KR | 20070032710 | 3/2007 |
| KR | 1020070032710 | 3/2007 |
| KR | 1020070069499 | 7/2007 |

OTHER PUBLICATIONS

Chinese Office Action issued Jan. 22, 2010 in CN Application No. 200810246384X.
Mexican Office Action issued Nov. 19, 2010 in MX Application No. MX/a/20008/015113.
European Search Report issued Feb. 24, 2011 in EP Application No. 08856217.8.

* cited by examiner

*Primary Examiner* — Sung H Pak
(74) *Attorney, Agent, or Firm* — Stanzione & Kim, LLP

(57) ABSTRACT

A liquid crystal display, wherein a printed circuit board equipped with light emission diodes serving as a light source is disposed on the rear surface of a reflection plate, to reduce manufacturing costs of the product by reducing a number of parts forming a back light unit and to easily emit heat, includes a liquid crystal panel, light emission diodes to emit light to be illuminated on the liquid crystal panel, a printed circuit board equipped with the light emission diodes, and a reflection plate to reflect light emitted from the light emission diodes toward the liquid crystal panel and includes through holes to pass the light emission diodes therethrough, wherein the printed circuit board is coupled to a rear surface of the reflection plate.

18 Claims, 5 Drawing Sheets

LIQUID CRYSTAL DISPLAY

CROSS-REFERENCE TO RELATED APPLICATIONS

This application claims priority under 35 U.S.C. §119(a) from Korean Patent Application No. 2007-0127121, filed on Dec. 7, 2007 in the Korean Intellectual Property Office, the disclosure of which is incorporated herein in its entirety by reference.

BACKGROUND OF THE INVENTION

1. Field of the Invention

The present general inventive concept relates to a liquid crystal display, and, more particularly, to a liquid crystal display wherein a printed circuit board equipped with light emission diodes serving as a light source is disposed on the rear surface of a reflection plate.

2. Description of the Related Art

A liquid crystal display is a device to display a desired image by controlling light transmissivity of liquid crystal cells arranged in a matrix according to image signal information. A back light unit illuminates light to form an image on a liquid crystal panel.

The liquid crystal display includes a liquid crystal panel with liquid crystal cells to form unit pixels, and a driving unit to drive the liquid crystal cells, and a back light unit to uniformly supply light to the liquid crystal panel.

The back light unit includes a light source to emit light to be illuminated to the liquid crystal panel, a reflection portion to reflect light emitted from the light source to the liquid crystal panel, and an optical sheet to diffuse light emitted from the light source and the reflection portion to be uniformly illuminated on the liquid crystal panel.

In addition to commonly-used cold cathode fluorescence lamps (CCFL), light emission diodes (LED) are recently used as the light source. In a case of using the light emission diodes (LED), forming a light source corresponding to a large-sized liquid crystal panel is beneficial and, particularly, providing a back light unit having a thin thickness is possible. Accordingly, the use of the light emission diodes is on an increasing trend.

In the liquid crystal display using the light emission diodes (LED) as the light source, a number of light emission diodes are arranged on a printed circuit board (PCB) having a power supply circuit at specific intervals. A reflective sheet is attached to a front surface of the printed circuit board to efficiently reflect light.

The printed circuit board is fixed on an inner surface of a lower chassis to support between the liquid crystal panel and the back light unit. However, finishing opposite sides of the lower chassis with additional reflective members to prevent light of the back light unit from leaking out through opposite sides of the lower chassis is necessary. Further, a reflective sheet is additionally attached to the surface of the printed circuit board with the light emission diodes to increase reflectivity.

Further, in the conventional liquid crystal display, a thermally conductive part is additionally disposed between the printed circuit board and the lower chassis to emit heat generated from the light emission diodes disposed on an inside of the lower chassis. Accordingly, as a number of parts increases, a cost of the product increases.

SUMMARY OF THE INVENTION

The present general inventive concept provides a liquid crystal display to reduce manufacturing costs of the product by reducing a number of parts forming a back light unit.

The present general inventive concept also provides a liquid crystal display to easily emit heat generated from a light source to the outside.

The present general inventive concept also includes parts, which are separately formed in the conventional case, and are unified by a reflection plate made of light reflective resin with high reflectivity. Thus, a number of parts can be considerably reduced resulting in the material cost being reduced. Also, an assembly process of many of the parts can be omitted, thereby reducing the total manufacturing cost of the product.

Additional aspects and/or utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a liquid crystal display including a liquid crystal panel, light emission diodes to emit light to be illuminated on the liquid crystal panel, a printed circuit board equipped with the light emission diodes, and a reflection plate to reflect light emitted from the light emission diodes toward the liquid crystal panel and includes through holes to pass the light emission diodes therethrough, wherein the printed circuit board is coupled to a rear surface of the reflection plate.

The reflection plate may be formed of a light reflective resin.

The reflection plate may be formed by injection molding using a material obtained by adding glass fiber to polycarbonate.

A ratio of glass fiber added to polycarbonate may be in a range of 10% to 20%.

A thickness of the reflection plate may be smaller than a thickness of the light emission diodes.

A support bracket may be disposed on the rear surface of the reflection plate to reinforce strength.

The support bracket may be disposed on a rear surface of the printed circuit board while the printed circuit board is coupled to the reflection plate in order to support the printed circuit board.

An engagement hook may be formed on the rear surface of the reflection plate, and an engagement hole may be formed on the printed circuit board to be coupled with the engagement hook.

An assembly groove is formed on the rear surface of the reflection plate to safely place the printed circuit board on the rear surface of the reflection plate.

A boss may be formed on a front surface of the reflection plate to be extended forward, and a screw hole may be formed on a rear surface of the boss for screw fastening between the printed circuit board and the reflection plate.

A reflection portion having an inclined surface may be formed at an outer end portion of the reflection plate to reflect light emitted from the light emission diodes toward the liquid crystal panel.

The foregoing and/or other aspects and utilities of the general inventive concept may be achieved by providing a liquid crystal display including a liquid crystal panel, light emission diodes to emit light to be illuminated on the liquid crystal panel, and a reflection plate including one or more reflection portions to reflect light emitted from the light emission diodes to the liquid crystal panel, and to support the liquid crystal panel, wherein the one or more of reflection portions are formed as a single body with the reflection plate.

The liquid crystal display may further include a printed circuit board to support the light emission diodes, and to form a power supply circuit.

The light emission diodes and the printed circuit board may be disposed on a rear surface of the reflection plate to prevent heat from remaining on an inside of the reflection plate.

The foregoing and/or other aspects and utilities of the general inventive concept may be achieved by providing a liquid crystal display including a liquid crystal panel, light emission diodes to emit light, and a reflection plate to support each of the light emission diodes to extend therethrough and including reflection portions disposed around an outer frame of the reflection plate to reflect the emitted light to the liquid crystal panel.

The reflection portions may have inclined surfaces formed on end portions of the outer frame.

The light emission diodes may be disposed on a printed circuit board and the reflection plate may include engagement hooks at a back portion thereof to engage with and support the printed circuit board.

BRIEF DESCRIPTION OF THE DRAWINGS

These and/or other aspects and utilities of the exemplary embodiments of the present general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
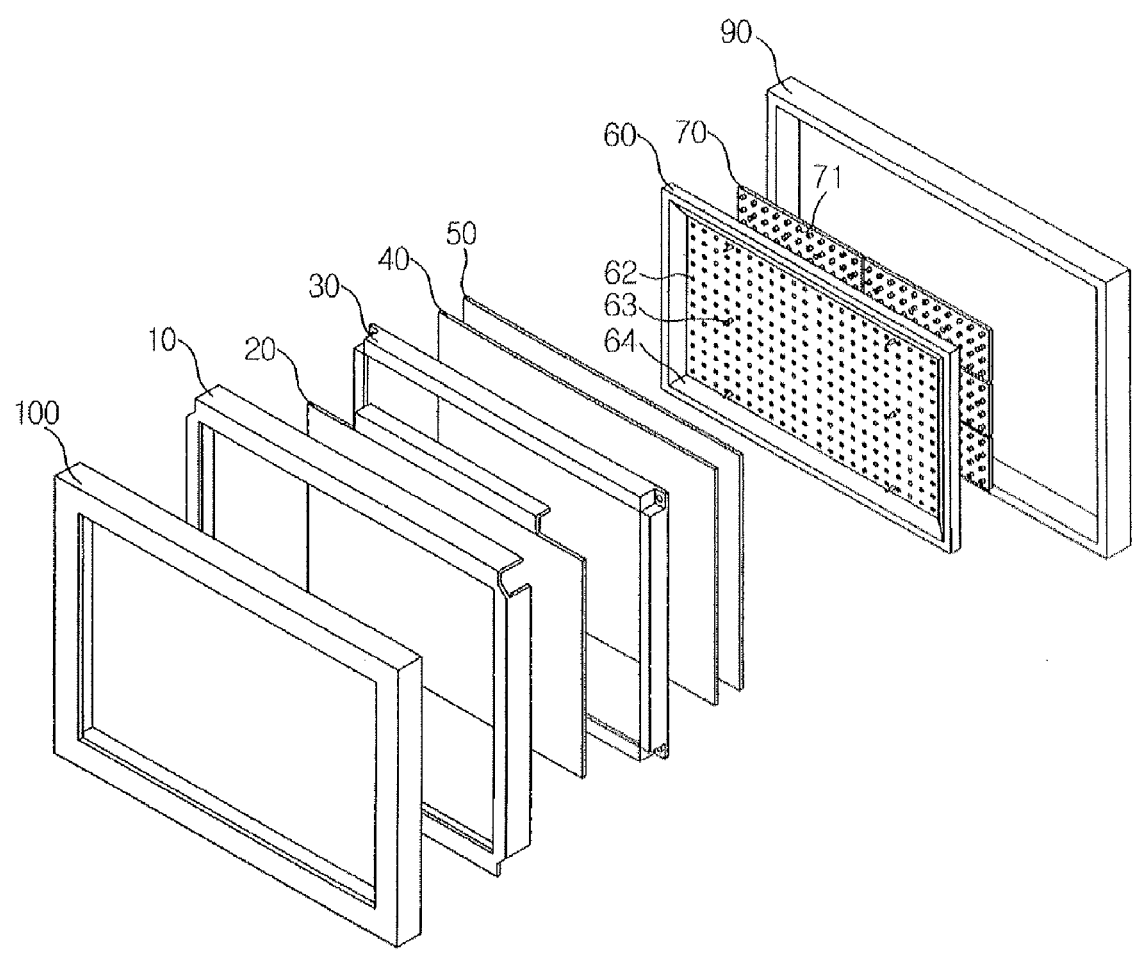
FIG. 1 illustrates an exploded perspective view illustrating a liquid crystal display according to an embodiment of the present general inventive concept.

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

FIG. 1 illustrates an exploded perspective view illustrating a liquid crystal display according to the embodiment of the present general inventive concept.

Referring to FIG. 1, the liquid crystal display includes a liquid crystal panel 20 which forms an image, optical films 40 and 50 which are disposed on a rear surface of the liquid crystal panel 20, a printed circuit board 70 which is equipped with light emission diodes 71 serving as a light source to illuminate light on the liquid crystal panel 20, and a reflection plate 60 which forms a reflective surface to illuminate light emitted from the light emitting diodes 71 to the liquid crystal panel 20.

The liquid crystal panel 20 includes a thin film transistor (TFT) substrate and a color filter which face each other, and a liquid crystal layer which is formed therebetween. The liquid crystal panel 20 forms an image on a respective surface thereof through light illuminated from the light source by adjusting light transmissivity. However, since the liquid crystal panel 20 is a non-luminous element incapable of emitting light, the light source is disposed at a rear of the liquid crystal panel 20 such that light is illuminated on the liquid crystal panel 20 to form an image with a predetermined brightness.

In this embodiment, the light emission diodes (LED) 71 are provided as the light source. A plurality of R/G/B light emission diodes 71 are alternately disposed on the printed circuit board 70 at specific intervals. A power supply circuit is provided on the printed circuit board 70 to supply power to the respective light emission diodes 71. A number of the light emission diodes 71 may increase or decrease according to a size of the liquid crystal panel 20 and an amount of light of the light emission diodes 71.

The optical films 40 and 50 which are disposed at a front of the light source include a diffusion plate 50 and an optical sheet 40. The diffusion plate 50 diffuses light irradiated from the light source to uniformly supply light on the entire liquid crystal panel 20.

The optical sheet 40 collects light diffused from the diffusion plate 50 and aligns a direction of light such that light is projected perpendicularly onto the surface of the liquid crystal panel 20. The optical sheet 40 may include a Fresnel lens having a prism formed on a respective surface thereof to refract transmitted light and a protection film to protect the prism formed on the surface.

A middle mold 30 is disposed between the liquid crystal panel 20 and the optical film 40. An upper chassis 10 is disposed at the front of the liquid crystal panel 20. The liquid crystal panel 20 is supported between the upper chassis 10 and the middle mold 30.

The reflection plate 60 forms the rear surface of the liquid crystal display. Further, the reflection plate 60 is made of light reflective resin with high reflectivity to reflect light emitted from the light emission diodes 71 to the liquid crystal panel 20.

Further, the reflection plate 60 is produced by injection molding using a material obtained by adding glass fiber to polycarbonate. When glass fiber is added to polycarbonate, the thermal expansion coefficient of the obtained injection molded product is reduced and thus the thermal deformation of the reflection plate 60 is reduced. The injection molding characteristics become excellent, and thus generation of problems in the injection molding is reduced. Further, a rigidity of the reflection plate 60 is enhanced, and thus preventing the reflection plate 60 from being deformed or components mounted in the reflection plate 60 from being broken due to an external impact is possible.

A ratio of glass fiber added to polycarbonate is in a range of 10% to 20%. When the rate of glass fiber added to polycarbonate is below 10%, an effect of glass fiber added to polycarbonate is insignificant, and when a rate of glass fiber added to polycarbonate is above 20%, mass productivity in injection molding is lowered.

The liquid crystal panel 20, the diffusion plate 50 and the optical sheet 40 are received between the upper chassis 10 and the reflection plate 60. The printed circuit board 70 equipped with the light emission diodes 71 serving as the light source is disposed on the rear surface of the reflection plate 60.

A rear cover 90 may be disposed at the rear of the reflection plate 60. A front cover 100, which is coupled to the rear cover 90, may be disposed at the front of the upper chassis 10.

A number of through holes 62 are formed on the reflection plate 60 such that the light emission diodes 71 can pass through the front surface of the reflection plate 60 while the printed circuit board 70 is coupled to the rear surface of the reflection plate 60. The through holes 62 are arranged at same intervals as the light emission diodes 71 disposed on the printed circuit board 70.

Further, bosses 63 are formed on the front surface of the reflection plate 60 to extend forward to support the optical sheet 40 and the diffusion plate 50. Reflection portions 64 having inclined surfaces are formed on end portions of an outer frame of the reflection plate 60 to reflect light emitted from the light emission diodes 71 to the liquid crystal panel 20.

Figure 2:
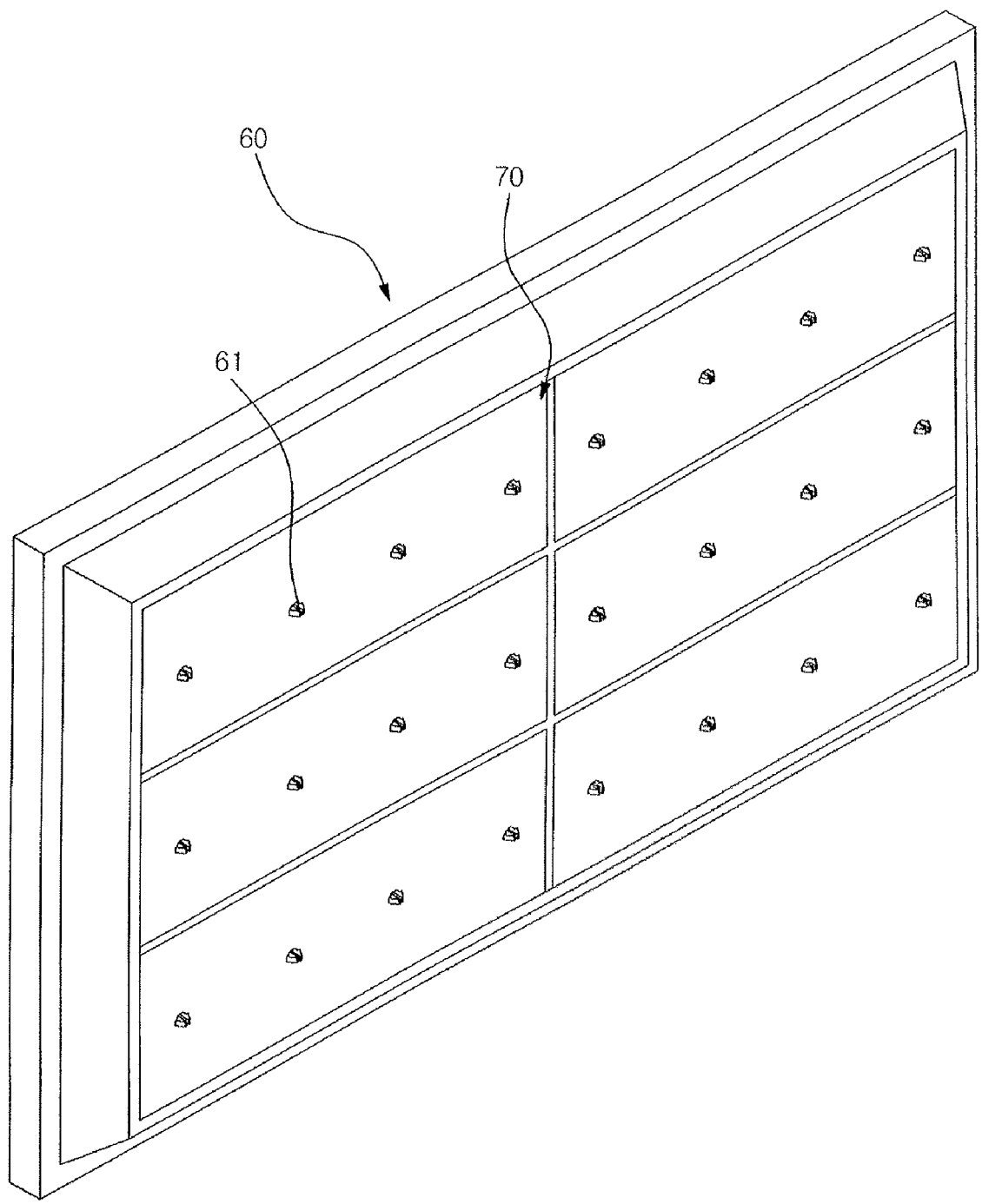
FIG. 2 illustrates a perspective view illustrating a printed circuit board coupled to a rear surface of a reflection plate according to an embodiment of the present general inventive concept.
Figure 3:
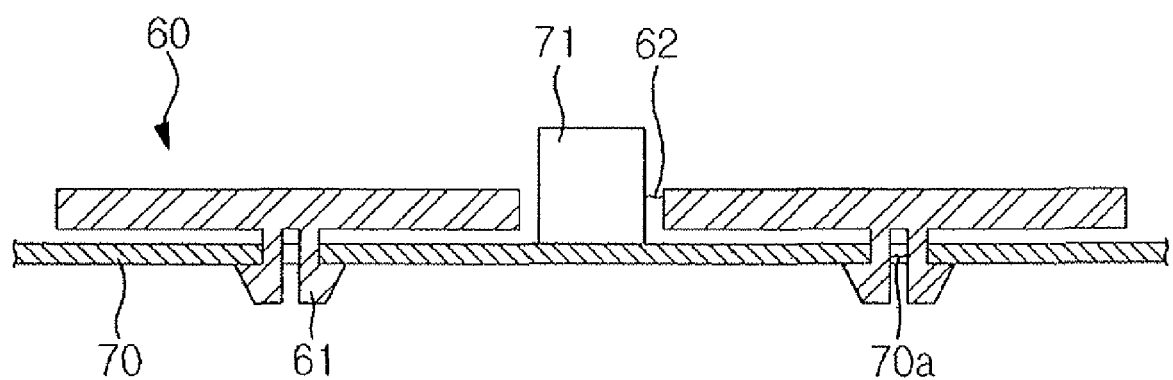
FIG. 3 illustrates a cross-sectional view illustrating a coupling structure between a reflection plate and a printed circuit board according to an embodiment of the present general inventive concept.

FIG. 2 illustrates a perspective view illustrating the printed circuit board coupled to the rear surface of the reflection plate according to an embodiment of the present general inventive concept. FIG. 3 illustrates a cross-sectional view illustrating a coupling structure between the reflection plate and the printed circuit board.

Referring to FIGS. 2 and 3, the printed circuit board 70 has a size corresponding to an entire area of the liquid crystal panel 20 (FIG. 1). The printed circuit board 70 may be divided into several boards to be arranged on the rear surface of the reflection plate 60 for convenience of a manufacture and assembly process. In this case, an assembly groove (not illustrated) of a recess shape may be formed on the rear surface of the reflection plate 60 in a same size as an area of each board of the printed circuit board 70 such that each board of the printed circuit board 70 can be safely placed on the rear surface of the reflection plate 60.

Further, a number of engagement hooks 61 are formed on the rear surface of the reflection plate 60 such that the printed circuit board 70 can be coupled to the reflection plate 60 by engagement. Engagement holes 70a are formed on the printed circuit board 70 at corresponding positions to be coupled with the engagement hooks 61.

Accordingly, when the printed circuit board 70 is pressed toward the reflection plate 60 while the engagement holes 70a of the printed circuit board 70 are positioned at the rear of the engagement hooks 61, the engagement hooks 61 pass through the engagement holes 70a. Thus, the printed circuit board 70 is coupled to the reflection plate 60 by engagement.

A height of the light emission diodes 71 protruded from the front surface of the reflection plate 60 is determined according to a thickness of the reflection plate 60 and a thickness of the light emission diodes 71.

If the thickness of the reflection plate 60 is larger than the thickness of the light emission diodes 71, front end portions of the light emission diodes 71 are received in the through holes 62 without being protruded from the front surface of the reflection plate 60 after passing through the through holes 62. In this case, a radiation angle of emitted light is limited and reflection efficiency is reduced, thereby causing an increase in light loss. Accordingly, the thickness of the reflection plate 60 at positions of the through holes 62, for example, may be smaller than the thickness of the light emission diodes 71 such that the light emission diodes 71 can be protruded from the front surface of the reflection plate 60.

Further, although the light emission diodes 71 are fixed to the lower chassis 60 through the printed circuit board 70 while the light emission diodes 71 are disposed on the printed circuit board 70 in this embodiment, the light emission diodes 71 may be directly fixed to the reflection plate 60 without the printed circuit board 70 if a power supply circuit for the light emission diodes 71 is formed on the rear surface of the reflection plate 60, or if circuit lines can be connected to the rear surface of the reflection plate 60.

Figure 4:
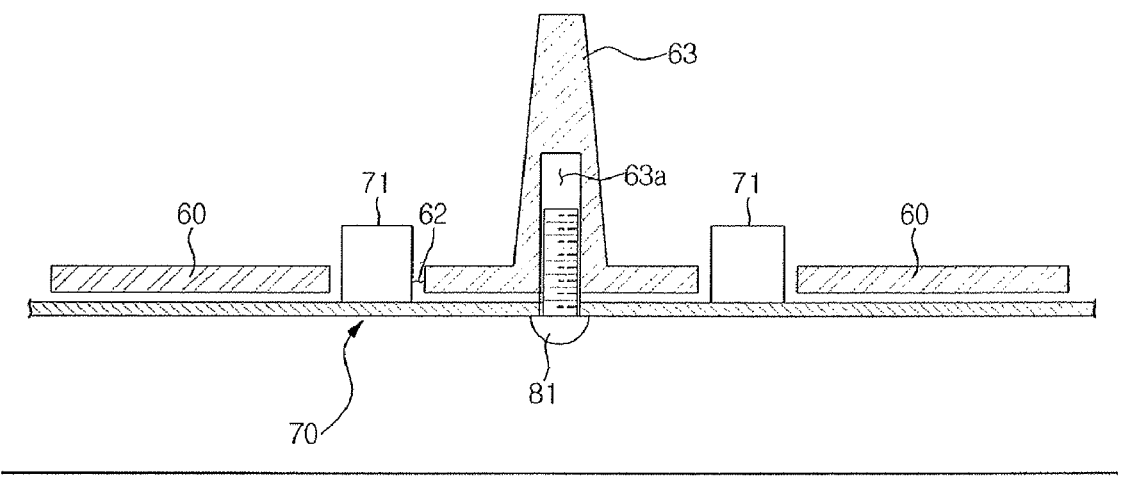
FIG. 4 illustrates a cross-sectional view illustrating a coupling state of a reflection plate and a printed circuit board according to another embodiment of the present general inventive concept.

FIG. 4 illustrates a coupling state of the reflection plate and the printed circuit board according to another embodiment of the present general inventive concept. In this case, the reflection plate 60 and the printed circuit board 70 are coupled to each other by a screw fastening method.

Screw holes 63a which are coupled to screws 81, for example, are formed on the rear surfaces of the bosses 63 such that portions of the screws 81 are not exposed on the front surface of the reflection plate 60 forming a reflective surface.

Figure 5:
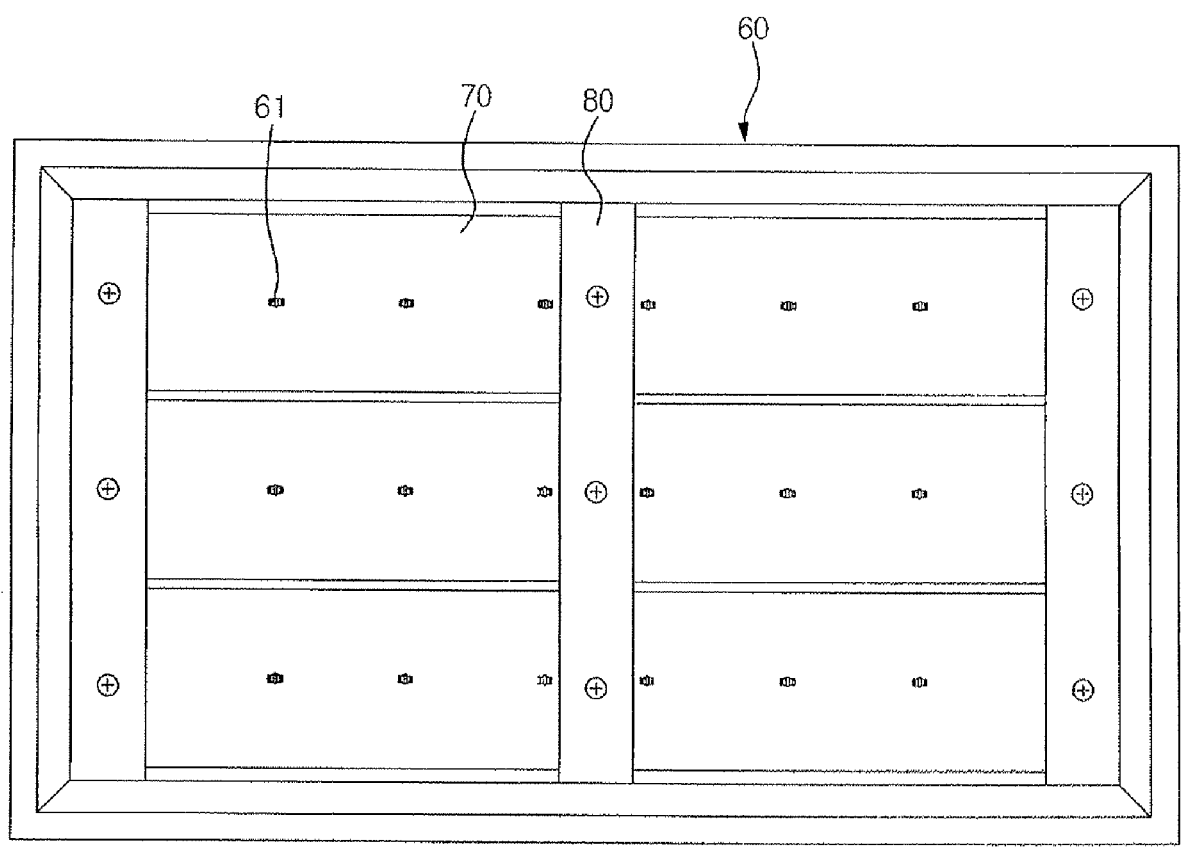
FIG. 5 illustrates a rear view of a reflection plate on which support brackets are disposed according to an embodiment of the present general inventive concept.

FIG. 5 illustrates a state in which support brackets are coupled to the rear surface of the reflection plate.

Support brackets 80 are disposed to reinforce strength of the reflection plate 60. Since the reflection plate 60 is formed of light reflective resin, the reflection plate 60 may have lower structural strength than a metal panel. Particularly, in a case of decreasing the thickness of the reflection plate 60 to reduce the material cost or the thickness of the liquid crystal display, or in a case of increasing the size of the reflection plate 60 for a large-sized liquid crystal display, the support brackets 80 may be disposed to reinforce a structural strength of the reflection plate 60.

The support brackets 80 may be assembled onto the reflection plate by a screw fastening method as in the illustrated embodiment. The support brackets 80 may be formed in a bar shape and arranged vertically on the rear surface of the reflection plate 60. In this case, when the support brackets 80 are assembled onto the reflection plate while the printed circuit board 70 is coupled to the reflection plate 60, the support brackets 80 can reinforce the strength of the reflection plate 60 and also support the printed circuit board 70 so as not to be separated from the reflection plate 60.

Further, a driving unit (not illustrated) to drive the liquid crystal panel 20 (FIG. 1) may be mounted on the rear surface of the reflection plate 60 in a form of a substrate. In this case, the driving unit is coupled to the support brackets 80 when the driving unit is assembled onto the rear surface of the reflection plate 60. Accordingly, the driving unit can be stably assembled compared to a case where the driving unit is coupled to the reflection plate 60.

As described above, in the liquid crystal display according to the present embodiment, the reflection plate 60 is made of light reflective resin to reflect light toward the liquid crystal panel 20. Accordingly, the reflection plate 60 serves as a reflective surface to reflect light emitted from the light emission diodes 71 to the liquid crystal panel 20 and also supports constituent parts such as the liquid crystal panel 20 and the diffusion plate 50 disposed on the inside of the reflection plate 60. Further, respective parts such as the reflection portions disposed at the outer frame of the lower chassis and bosses, which are separately formed and assembled in the conventional case, are unified and formed as a single body with the reflection plate. Accordingly, a number of parts can be considerably reduced.

Further, the light emission diodes 71 serving as a heating element and the printed circuit board 70 to support the light emission diodes 71 and to form a power supply circuit are arranged on the rear surface of the reflection plate 60. Accordingly, heat generated from the light emission diodes 71 can be quickly emitted without remaining on the inside of the reflection plate 60. Thus, natural cooling can be achieved without an additional cooling unit such as a cooler to emit the heat generated from the light emission diodes 71.

Although various embodiments of the present general inventive concept have been illustrated and described, it would be appreciated by those skilled in the art that changes may be made in this embodiment without departing from the principles and spirit of the general inventive concept, the scope of which is defined in the claims and their equivalents.

What is claimed is:

1. A liquid crystal display, comprising:
   a liquid crystal panel;
   light emission diodes to emit light to be illuminated on the liquid crystal panel;
   a printed circuit board equipped with the light emission diodes; and
   a reflection plate to reflect light emitted from the light emission diodes toward the liquid crystal panel and that includes through holes to pass the light emission diodes therethrough and includes an integrally formed connection member extending from the reflection plate to fix the printed circuit board to the reflection plate,
   wherein the printed circuit board is coupled to a rear surface of the reflection plate.

2. The liquid crystal display according to claim 1, wherein the reflection plate is formed of a light reflective resin.

3. The liquid crystal display according to claim 1, wherein the reflection plate is formed of a material glass fiber and polycarbonate.

4. The liquid crystal display according to claim 3, wherein a ratio of the glass fiber to the polycarbonate is in a range of 10% to 20%.

5. The liquid crystal display according to claim 1, wherein a thickness of the reflection plate is smaller than a thickness of the light emission diodes.

6. The liquid crystal display according to claim 1, wherein a support bracket is disposed on the rear surface of the reflection plate to reinforce strength.

7. The liquid crystal display according to claim 6, wherein the support bracket is disposed on a rear surface of the printed circuit board while the printed circuit board is coupled to the reflection plate in order to support the printed circuit board.

8. The liquid crystal display according to claim 1, wherein an engagement hook is formed on the rear surface of the reflection plate, and an engagement hole is formed on the printed circuit board to be coupled with the engagement hook.

9. The liquid crystal display according to claim 1, wherein an assembly groove is formed on the rear surface of the reflection plate to safely place the printed circuit board on the rear surface of the reflection plate.

10. The liquid crystal display according to claim 1, wherein a boss is formed on a front surface of the reflection plate to be extended forward, and a screw hole is formed on a rear surface of the boss for screw fastening between the printed circuit board and the reflection plate.

11. The liquid crystal display according to claim 1, wherein a reflection portion having an inclined surface is formed at an outer end portion of the reflection plate to reflect light emitted from the light emission diodes toward the liquid crystal panel.

12. A liquid crystal display, comprising:
    a liquid crystal panel;
    light emission diodes to emit light to be illuminated on the liquid crystal panel; and
    a reflection plate including one or more reflection portions to reflect light emitted from the light emission diodes to the liquid crystal panel, and to support the liquid crystal panel,
    wherein the one or more of reflection portions are formed as a single body with the reflection plate.

13. The liquid crystal display according to claim 12, further comprising:
    a printed circuit board to support the light emission diodes and to form a power supply circuit.

14. The liquid crystal display according to claim 13, wherein the light emission diodes and the printed circuit board are disposed on a rear surface of the reflection plate to prevent heat from remaining on an inside of the reflection plate.

15. The liquid crystal display of claim 12, wherein the one or more reflection portions extend at an angle toward the LCD panel from at least one edge of the reflection plate.

16. A liquid crystal display, comprising:
    a printed circuit board mounted with a plurality of light emission diodes; and
    a reflection plate including an integrally formed connection member to couple the reflection plate to the printed circuit board.

17. The liquid crystal display of claim 16, wherein an engagement hook is located on the rear surface of the reflection plate, and
    an engagement hole is formed on the printed circuit board to be coupled with the engagement hook,
    the engagement hook located on the rear surface of the reflection plate to engage the engagement hole formed on the printed circuit board.

18. The liquid crystal display of claim 17, wherein the integrally formed connection member is a boss formed on a front surface of the reflection plate and extending forward to receive a screw to couple the printed circuit board and the reflection plate.

* * * * *